US011557901B2

(12) United States Patent
Brombach (10) Patent No.: US 11,557,901 B2
(45) Date of Patent: Jan. 17, 2023

(54) METHOD FOR FEEDING ELECTRICAL POWER INTO AN ELECTRICAL SUPPLY GRID (71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/534,242

(22) Filed: Nov. 23, 2021

(65) Prior Publication Data

US 2022/0166221 A1 May 26, 2022

(30) Foreign Application Priority Data

Nov. 25, 2020 (EP) .................................... 20209764

(51) Int. Cl.
*H02J 3/38* (2006.01)
*H02J 3/14* (2006.01)
*H02J 3/16* (2006.01)

(52) U.S. Cl.
CPC ................ *H02J 3/381* (2013.01); *H02J 3/14* (2013.01); *H02J 3/16* (2013.01); *H02J 2300/24* (2020.01); *H02J 2300/28* (2020.01)

(58) Field of Classification Search
CPC ...... H02J 3/38; H02J 3/381; H02J 3/14; H02J 3/16; H02J 2300/28; H02J 2300/24
See application file for complete search history.

(56) References Cited

U.S. PATENT DOCUMENTS

| 2016/0087445 | A1 | 3/2016 | Beekmann et al. |
| 2018/0372074 | A1 | 12/2018 | Brombach |
| 2020/0116127 | A1 | 4/2020 | Brombach |
| 2020/0130527 | A1 | 4/2020 | Brombach et al. |
| 2020/0328599 | A1 | 10/2020 | Brombach |
| 2020/0366100 | A1 | 11/2020 | Brombach et al. |
| 2021/0044115 | A1 | 2/2021 | Quitmann et al. |

FOREIGN PATENT DOCUMENTS

| DE | 10 2013 207 255 A1 | 10/2014 |
| DE | 10 2016 101 468 A1 | 7/2017 |
| DE | 10 2016 106 215 A1 | 10/2017 |
| DE | 10 2017 112 944 A1 | 12/2018 |
| DE | 10 2018 102 220 A1 | 8/2019 |
| DE | 10 2018 102 224 A1 | 8/2019 |
| EP | 2 983 264 A1 | 2/2016 |
| WO | 2018/193091 A1 | 10/2018 |

*Primary Examiner* — Robert L Deberadinis
(74) *Attorney, Agent, or Firm* — Seed IP Law Group LLP (57) ABSTRACT

Provided is a method for feeding electrical power into an electrical supply grid that has a grid voltage and a grid frequency. The grid comprises consumers for consuming electrical power from the grid, and generators for generating electrical power and feeding the electrical power into the grid. A feed management system is provided for managing the feed. The feed management system takes into consideration a power flow stipulation for a power flow in at least one grid segment of the electrical supply grid, an energy provision stipulation for the provision of a quantity of energy at at least one consumption point of the electrical supply grid, and a stability stipulation that specifies at least one stability criterion for the electrical supply grid. The feed management system, depending on the power flow stipulation, the energy provision stipulation and the stability stipulation, selects or adjusts a master controller to support the feed.

15 Claims, 4 Drawing Sheets

METHOD FOR FEEDING ELECTRICAL POWER INTO AN ELECTRICAL SUPPLY GRID

BACKGROUND

Technical Field

The present invention relates to a method for feeding electrical power into an electrical supply grid. The present invention also relates to a grid control apparatus for controlling the feed of electrical power into an electrical supply grid. The invention further relates to a grid segment with at least one wind power installation or at least one wind farm, or both, for feeding electrical power into an electrical supply grid.

Description of the Related Art

Electrical supply grids are known, and usually comprise a plurality of consumers that consume electrical power from the electrical supply grid, and a plurality of generators that generate electrical power and feed it into the electrical supply grid. Such electrical supply grids can be large and highly branched, and can transport power over great distances, in some cases of several hundred kilometers or even further.

Stability must in principle always be guaranteed in such an energy supply system. A balance between generation and load, i.e., consumption, must also be ensured as closely as possible at any time. Usually, the stability is guaranteed as far as possible by the design of the operating means and the physical properties of the feed installations, which can, for simplicity, also be referred to as generators, and the loads which, synonymously, can also be referred to as consumers. The physical properties of the feed installations can, for example, be physically determined capabilities for the provision of an instantaneous reserve, the ability to impose a voltage, i.e., in particular a voltage-impressing feed, as well as the ability to make a contribution to a short circuit.

In addition to the stability that is to be guaranteed, and the desired power balance, an energy system must necessarily also be optimized economically. This includes operating the feed installations, in some cases also the loads, or some of them, in such a way that the lowest possible costs arise while, however, as much power or energy as possible is fed into the electrical supply grid.

Controllers with appropriate tasks may be present in order to operate an electrical supply grid stably but also in as economically optimized a manner as possible. A power control system that is configured to control a power balance and/or a power flow can be provided for this purpose. This can include selecting power paths in a meshed electrical supply grid, or guiding power via different power paths in order in that way to avoid power flow overloads and to achieve the most even distribution possible. The same applies to the feed and consumption of electrical power that can also in certain cases be controlled in order to avoid power peaks.

An energy control system that is used to control generated energy can, moreover, be provided. In this respect, the control of the power relates to instantaneous situations, and in particular has the task of avoiding power overloads. A levelling is ideally performed, but this also only affects the specific instant. An energy control system here also takes a temporal profile, and in particular a time segment in which or for which the energy generated is controlled, into consideration for controlling generated energy. It can in particular be provided that an energy control system controls the generated energy in such a way that energies or energy quantities that are demanded can be generated and made available, wherein the power control system controls the power, both the generated power and the transported power, in such a way here that the electrical supply grid is as evenly loaded as possible, at least to the extent that excessive increases in the power, i.e., power peaks, are avoided or at least remain under stipulated limits.

Stability is fundamentally assumed here as an existing system property, i.e., as presupposed, although different feed installations, as well as loads, have a different influence on the stability.

Thus, for example, a conventional power station, in which a synchronous electrical generator is directly coupled to the electrical supply grid can exercise a different effect on the stability from, for example, a wind farm with many modern—and therefore large—wind power installations having the same or similar rated power.

To achieve a stabilizing effect like that of a conventional power station, there are solutions that require wind parks to have a similar feed behavior to that of a conventional power station with a directly coupled synchronous generator. The same applies to other regenerative generators, in particular photovoltaic installations.

In this respect, while harmonization can be achieved under certain preconditions, the physical properties of different generators nevertheless remain different. Not only can the physical properties of the respective generator play a role here, but also the distribution and/or the respective, specific location of the generator in the electrical supply grid. Such special features cannot be taken into consideration, or at least not comprehensively, solely through a partial harmonization of required behavior for individual generators.

The European Patent Office has searched the following prior art in the priority application relating to the present application: DE 10 2016 106215 A1, WO 2018/193091 A1, DE 10 2018 102224 A1, DE 10 2013 207255 A1, DE 10 2018 102220 A1, DE 10 2017 112944 A1, EP 2 983 264 A1 and DE 10 2016 101468 A1.

BRIEF SUMMARY

One or more embodiments are directed to controlling a stabilization of an electrical supply grid, in particular taking a power control by a power control system into consideration and/or taking a control of generated energy by an energy control system into consideration.

A method is proposed. The method relates to the feed of electrical power into an electrical supply grid. The electrical supply grid has a grid voltage and a grid frequency. It also comprises a plurality of consumers for consuming electrical power from the electrical supply grid, and a plurality of generators for generating electrical power and for feeding the electrical power into the electrical supply grid. A usual electrical supply grid with consumers and generators is assumed in this respect.

A feed management system is provided for managing the feed. This feed management system can also be referred to as a control of the feed or as a feed controller. It takes a power flow stipulation that establishes a stipulation for a power flow in at least one grid segment of the electrical supply grid into consideration. Such a power flow stipulation can refer to an upper limit for a power flow, or to a distribution of multiple power flows across multiple transmission paths, or a stipulation relating to changes in a power flow, for example through the stipulation of maximum change rates or change gradients. Power flow is to be understood here to refer to the transmission of electrical power over a transmission path.

This is based on recognition of the fact that arbitrarily high powers cannot be transmitted over such transmission paths, i.e., in particular over corresponding transmission lines, and that the transmission of electrical power also results in an effect on the electrical supply grid. The transmission of electrical power at the corresponding transmission path, or the corresponding electrical power, leads in particular to a voltage drop over this path or over this line. This in turn has an effect on a voltage level at corresponding node points. This can all be taken into consideration or controlled by a power flow stipulation. In particular, a power flow stipulation can prevent the transmission of a power that is so large that an associated transmission path is overloaded.

A power flow stipulation can also here signify that a power flow is specified at a plurality of segments, in particular for each of multiple transmission paths. Such transmission paths can be connected at connecting nodes where the power flows then combine and supplement each other, in particular being added together. A suitable power flow stipulation can then also prevent such an addition of power flows from leading to an overload.

The feed management system also takes an energy provision stipulation that establishes a stipulation for the provision of a quantity of energy at at least one consumption point of the electrical supply grid into consideration. The fact that the energy generation and the energy consumption in an electrical supply grid usually take place at separate locations is in particular to be taken into consideration here. A consumer or a group of consumers can, for example, request a quantity of energy at the consumption point, which is moreover remunerated. This requested quantity of energy should then be fulfilled, and an energy provision stipulation can be used for this purpose.

A distinction is in particular to be drawn between a power flow stipulation and an energy provision stipulation. Specifically, at least one power flow is necessary in order to provide energy. The power flow stipulation relates, however, to the transmission of power over a transmission path, whereas the energy provision relates to the provision of energy at a consumption point. The provision of the energy at a consumption point can be realized in a variety of ways if multiple transmission paths lead to this consumption point. The power flow stipulation and the energy provision stipulation are thus two separate stipulations, which both must be taken into consideration and then matched to one another.

The feed management system, moreover, takes a stability stipulation that specifies at least one stability criterion for the electrical supply grid into consideration. A stability stipulation can be related to the power flow stipulation and/or the energy provision stipulation, since, for example, an overload of a transmission path can lead to an instability or can weaken the stability. Nevertheless, the stability stipulation is an independent stipulation that in any event is not necessarily satisfied when arbitrary power flow stipulations are met. A stability stipulation is, rather, also to be taken into consideration. The stability stipulation can, for example, relate to maintaining a frequency range or to maintaining a voltage range. It can, for example, also relate to satisfying a fluctuation criterion, according to which, namely, excessively high fluctuations should not occur. This can in particular relate to sub-synchronous fluctuations, i.e., low-frequency fluctuations. The stability stipulation can, for example, also relate to the stipulation of a maximum grid sensitivity.

To this end it is proposed that the feed management system selects, depending on the power flow stipulation, a master controller to support the feed the energy provision stipulation and the stability stipulation.

This is particularly based on the recognition of the fact that in the past the feed has only taken one or two of these stipulations into consideration. Regenerative energy sources in particular, i.e., regenerative feed installations such as photovoltaic installations, wind power installations or wind farms, preferably feed in what is known as a grid-parallel operation. They thus feed in as much electrical power as they are able to feed on the basis of the prevailing regenerative energy source, i.e., in particular solar radiation or wind. To assist the grid, they can also be limited, for example if the grid frequency rises and an excess power in the electrical supply grid is therefore to be assumed. Such a frequency-dependent power reduction can be understood as a stability stipulation. A power flow stipulation or an energy provision stipulation are, however, not yet taken into consideration here.

Conventional feed installations, power stations or large power stations in particular, normally feed depending on an energy requirement in the electrical supply grid. In this respect they take an energy provision stipulation into consideration. A power flow stipulation is, however, not usually taken into consideration here. A stability stipulation here is instead taken into consideration indirectly, in that the large power station that is feeding attempts to provide the most stable possible working point.

A power flow stipulation can then be achieved through appropriate switching of the network topology, and also through the selection of which power stations, at which locations in the electrical supply grid, provide feed.

It is also to be noted that an energy provision stipulation nowadays often depends on the energy packages negotiated on the energy market. The participants here often attempt to purchase energy as cheaply as possible, while others attempt to sell energy for the highest possible prices. This then leads to energy provision stipulations that must be implemented in the electrical supply grid.

It is thus proposed that these three stipulations, which is to say a power flow stipulation, an energy provision stipulation and a stability stipulation are taken into account jointly, and that a master controller is proposed for this purpose. It has been recognized here that the selection of a master controller can already depend on the three stipulations, or that an appropriate controller can be selected according to how these three stipulations are configured. Adjusting it can, however, also be considered, in particular in that a master controller with corresponding functionalities or controllers already exists, and that it, or the controllers contained in it, are however adjusted in accordance with said stipulations.

Preferably, at least one of the following comes into consideration as a master controller, wherein a plurality can also be selected and combined.

A grid topology controller that is configured to change a grid topology of the electrical supply grid can be selected as a master controller. Thus a grid topology controller can, in particular, operate switches in the electrical supply grid in order in that way to control power flows in particular, namely, to select or to provide transmission paths. A topology change to the grid topology can also mean that a generator or consumer is switched in or out. The selection of a network topology controller is particularly appropriate if unequal power flows are specified, or if strongly varying power flows are specified.

The selection of a grid topology controller is in particular also to be considered if, to refer to a simple example, a specific power is to be transmitted between two points, and that multiple transmission paths come into consideration for this. The grid topology controller can then provide suitable transmission paths through appropriate switching or through appropriately retaining transmission paths that already exist, i.e., by avoiding switching actions.

It should be borne in mind that the feed management system thus takes over all of the coordination, and that corresponding master controllers are available. These master controllers are then appropriately employed. Such a procedure can also change regularly, in particular if the stipulations change.

In any event, an auxiliary controller that can be selected as a master controller or as one of the master controllers can be considered as a further controller, being designed to control a grid voltage, a grid frequency and/or a power balance of the electrical supply grid.

The auxiliary controller can in particular control generators or feed installations or can give them corresponding control signals for this purpose. The feed installations can, in particular, change the reactive power that they are feeding in order to affect the grid voltage and/or change their reactive power in order to change the grid frequency. Interdependencies also, however, exist, and the real and reactive power can both each be adjusted to an appropriate working point. A power balance of the electrical supply grid can in this way also be controlled. A power balance is, in particular, a balance between provided power, i.e., power fed in by a generator, and consumed power, i.e., power withdrawn by consumers.

A power balance can be read from the grid frequency which, namely, rises when too much power is available and which falls when too little power is available, i.e., when the consumers wish to withdraw more power than the generators are feeding. It is, however, proposed here that a power balance may also be considered in another way where appropriate. One possibility is that of including corresponding consumption values from the generators and consumers, or from representative key nodes. Consideration is namely given here to the fact that as the electrical supply grid changes, and in particular with the decline of classic large power stations that provide their feed through directly coupled synchronous generators, the grid frequency can become a less and less meaningful indicator.

In any event, an auxiliary controller can have an effect on these values, i.e., in particular on the real and/or reactive power that is fed in.

The selection of an auxiliary controller as a master controller or as part of the master controller can in particular take place when this is required by a stability stipulation. The stability stipulation can here also be taken into consideration in connection with the stability situation. A stability stipulation can consist in providing a maximum fluctuation range for the grid voltage and/or the grid frequency. The greater this fluctuation range, the less important can an auxiliary controller sometimes be. The extent to which a permitted fluctuation range is already currently being used, in other words whether the grid voltage and/or grid frequency are close to reaching and exceeding limits, can however also be taken into consideration here.

The selection of an auxiliary controller may also, however, be considered when an energy provision stipulation shows a large change in a short time. Depending on the present situation, the selection of a grid topology controller can be useful for this purpose, namely when current transmission paths appear—potentially with the further consideration of a power flow stipulation—to be inadequate. An auxiliary controller can be selected if this problem is not present. The auxiliary controller can also be additionally selected, however, if said problem in fact is indeed present.

The auxiliary controller can in particular be selected if, in said example of the increase in energy due to the rising energy provision stipulation, a large change in the power balance is to be expected. The auxiliary controller can be used then, or even in advance, in order, for example, for regenerative generators to provide reserve power at short notice. The auxiliary controller can thus specify for one or for a plurality of regenerative generators, that they feed a specific value, for example a specific percentage value, below their current available power. When the recognizable increase in the energy then arises, i.e., in accordance with the energy provision stipulation, this reserve power can then be used to fulfil or support this energy provision.

A load controller that is designed to control at least one of the consumers can also be selected as a master controller or as part thereof. In this respect, the load controller can also function as a special auxiliary controller which, namely, appropriately controls one consumer. The load controller can also, however, be used to advantageously influence a power or energy distribution, independently of a requirement for support. The load controller can in particular also be selected depending on an energy peak or energy drain that is predicted by the energy provision stipulation. A controllable consumer can briefly manage without drawing power, in particular if there is a high power requirement in its physical vicinity.

The load controller can here in particular also take the special features of the respective load into consideration. It can in particular ensure that a brief reduction in a power consumption of a load is also followed by a rise in the power consumption. This applies in particular to loads that on average do not allow a changed power consumption, or for which this is at least unfavorable. For other loads, such as for example what is known as a power-to-gas unit that generates hydrogen or natural gas from electrical current, a long-term change in the power is also permissible. The problem here may be, instead, that fluctuations that are too fast or too great are not permissible. The load controller can take all of this into consideration. The load controller can, in particular, also lead to a consolidation in the electrical supply grid. It can therefore in particular be selected in the case of energy fluctuations that are predicted by a corresponding energy provision stipulation.

It is proposed according to one aspect, that at least one stabilization measure is implemented in the master controller. This stabilization measure can be implemented through one or a plurality of said controllers. It can thus be implemented by the grid topology controller, the auxiliary controller and/or the load controller, or in other ways. In any event, stabilization measures can be implemented in the master controller in this way or in other ways.

Adjusting a converter penetration of a grid segment of the electrical supply grid is proposed as an implementation measure. The converter penetration for the grid segment is a ratio of a sum of power fed in by converters to the power fed in altogether by all the generators. Electrical power from regenerative generators is in particular fed in by converters, i.e., frequency converters. Their proportion of the feed into the grid segment can be adjusted here.

It is recognized here in particular that these converter-controlled generators or feed installations are in most cases the generators with the fastest control dynamic. They can react very quickly to power drops, i.e., if less power suddenly has to be fed in, because, for example, a large consumer is switched off or other power drops are to be expected. On the other hand, regenerative generators, unless they are providing reserve power, cannot easily increase the power fed in. Thus if a situation is present in which a power increase is to be expected, it can be provided that the proportion of power fed in from converters is reduced. Such a reduction can, moreover, immediately result in reserve power.

On the other hand, directly coupled synchronous generators, particularly those of large power stations, can have a stabilizing effect on the electrical supply grid, and in particular can achieve good frequency stabilization. Reducing the converter penetration can therefore be useful in order to meet such stability requirements.

The reduction in the converter penetration can be done in such a way that the corresponding feed installations or generators, namely those that feed by means of converters, reduce the power they are feeding in. Switching in large power stations, however, also comes into consideration. Changing the converter penetration through connecting an existing grid segment to another grid segment or disconnecting from it may also be considered. If this other grid segment has a different converter penetration, the total converter penetration is thereby changed.

The adjustment of the converter penetration by a network topology controller can thus, however, also be performed by an auxiliary controller.

The adjustment of a converter penetration is in particular carried out with a network topology controller.

A stabilization measure can be the provision of a predefined minimum short-circuit current capacity, in order when necessary to enable feeding in a short-circuit current at least up to the level of a predefined minimum short-circuit current, at least at one grid node, in order in this way to trigger a respective isolating switch in order to deliberately disconnect a grid segment. The provision of a minimum short-circuit current at selectively switching elements, i.e., in particular at selective protective switches, is in particular provided.

Such a measure can in particular be provided when an isolating switch cannot be driven to disconnect. Such isolating switches can be designed as protective switches to protect against excessive current, and are referred to as selective protective switches. The short-term provision of an excessive current then results in triggering. Such an excessive current is thus provided according to this aspect in that an appropriately high level of a minimum short-circuit current capacity is provided.

Such a minimum short-circuit current capacity can be achieved through an appropriate number of generators and/or through a corresponding, brief, operation of the generators at a working point that enables a correspondingly high short-circuit current.

The provision of a predefined minimum short-circuit current capacity is in particular carried out by a grid topology controller.

According to one aspect, an activation of at least one converter of a photovoltaic installation can be provided in order to provide a short-circuit current or supplementary short-circuit current for activating the isolating switch in order in this way to deliberately disconnect the grid segment. A converter can have an appropriate energy in its DC link, and also in the solar cells that, in addition to generating current from solar radiation, also have a high capacity as a property. The short-circuit current can in particular be provided as reactive current, and this can be fed into the electrical supply grid up to a certain residual voltage, even when the primary energy source is switched off or not present. A static synchronous compensator (STATCOM) operation with fault ride-through (FRT) properties can thus be achieved with this.

An accordingly high short-circuit current can therefore be provided by a converter of a photovoltaic installation. This should be exploited here.

The activation of at least one converter of a photovoltaic installation for the provision of a short-circuit current is in particular performed by a network topology controller.

According to one aspect, it is proposed that a frequency-dependent power control is activated or adjusted. A frequency-dependent power control is known in principle; it can create a relationship, in particular a linear relationship, between a frequency deviation and an additional real power to be fed in. A reduced power is also to be understood here as an additional power. In any event, electrical power is usually in any case fed in by a generator, and this is increased or decreased depending on a frequency deviation. The master controller can activate such a frequency-dependent power control, and of course also deactivate it, as well as adjust it if it is activated. The relationship between the power change and the frequency deviation can in particular be adjusted, namely in particular through a static.

The activation or adjustment of a frequency-dependent power control is in particular performed by means of an auxiliary controller.

According to one aspect, the activation of a mechanically rotating phase-shifter is implemented in the master controller. Such a mechanically rotating phase-shifter is connected to a directly coupled synchronous generator. Such a phase shifter comprises an inertial mass, namely one that rotates, and it can provide a short-circuit current and/or a reactive power. This is done by a synchronous generator that is coupled directly to the electrical supply grid. This is thus a rotating synchronous machine which, in accordance with its physical properties, can feed in a reactive power in the presence of a reduced voltage, or can change reactive power that is fed in, i.e., can also reduce it when appropriate.

Such a synchronous generator can, moreover, also provide a short-circuit current. This can on the one hand be provided in that the generator generates corresponding current as a result of its rotation, which is driven onward due to the inertial mass. In addition, the short-circuit current can result from the collapsing magnetic field in the event of a short circuit.

The provision of voltage-impressing properties can also be achieved by a rotating phase-shifter.

The activation of a mechanically rotating phase-shifter is in particular performed by means of an auxiliary controller. The performance of this task by a grid topology controller may also be considered, in particular in that it switches on the phase-shifter. This may be considered in particular when a short-circuit power is to be provided, or it is foreseen that a short-circuit current, or an increased short-circuit current, will be needed.

According to one aspect, the activation of a voltage-impressing mode of operation, namely at least one regenerative generator, in particular a wind power installation or a photovoltaic installation, is implemented as a stabilization measure in the master controller. It is thus in particular proposed that a converter-controlled generator changes entirely or partially into a voltage-impressing mode of operation. Converter-controlled generators usually operate in a current-impressing manner. They feed in a predefined current. This is either specified through computation and achieved through pulse-width modulation, or is even regulated out when a tolerance-band method is used.

Such a current-impressing mode of operation is therefore typical for converter-controlled generators, and can be realized with little control energy. Deviating at least temporarily from this advantageous and proven mode of operation is, however, proposed here. Fundamentally this can be unfavorable for the regenerative generator, in particular impairing its efficiency, but can be useful in exceptional cases for voltage stabilization, and is proposed. It is in particular important here that the master controller has implemented this as a possibility, and can, when necessary, fall back on it.

It is proposed according to one aspect that the activation or control of a load that operates depending on the grid frequency and controls power consumption depending on the grid frequency, is implemented as a stabilization measure in the master controller. Such a load can thus be activated here, or this mode can be activated for an existing load. Loads in particular that comprise an electric motor, or even a directly coupled electric motor, or that draw their energy from the electrical supply grid via a converter, can control such a frequency-dependent power consumption. This can also include the possibility that this power consumption, depending on the frequency, is briefly negative.

It is in particular recognized here that the grid stability can depend on a load situation. The grid stability can thus be improved through the proposed measure. Preferably, here, the load type can also be changed, namely whether the load operates primarily as a resistive load or as a motor load. It is in particular to be considered here that a corresponding motor is driven and/or is coupled in or disconnected. It is also to be considered that this desired behavior can be achieved through appropriate programming when a frequency converter is used. A converter can, for example, be controlled in such a way that it draws a current with the same phase position out of the electrical supply grid. It then acts like a resistive consumer. It can, however, also change the phase position; the greater the phase angle, the more it develops an additional inductive property which can, if necessary, even entirely take the place of the resistive property.

With the corresponding use of a directly coupled motor, a behavior can even be achieved in which the power consumption is dependent on the speed of rotation, and a power consumption dependent upon the grid frequency is thus realized. Depending on the motor used or how it is adjusted, the power consumption can be proportional to the third power of the speed of rotation, and thereby proportional to the third power of the grid frequency. Pumps and fans that have corresponding characteristic curves come into particular consideration here. A very strong stabilization effect, i.e., a very strong frequency-dependent change in the power, can thereby be achieved.

The activation or control of at least one load working depending on the grid frequency is in particular performed by means of a load controller.

According to one aspect, a stabilization measure is implemented in the master controller, and is configured such that at least one available instantaneous reserve is made available. It is in particular proposed that an instantaneous reserve is provided by a regenerative generator. It is also to be considered that an available instantaneous reserve is increased. The instantaneous reserve of a wind power installation can, in particular, be increased by increasing a rotor rotation speed of the wind power installation. For this purpose, a control of the wind power installation is additionally to be provided or, if appropriate, adjusted in such a way that the power made available in this way can also be appropriately called up. This control can be referred to as an instantaneous reserve control, and in particular output an additional power depending on a frequency change, in particular a frequency reduction.

An instantaneous reserve can thus be provided from the rotation energy of a rotor of the wind power installation. It is not necessary for this purpose for the generator of the wind power installation to be directly coupled to the electrical supply grid. A converter is usually fast enough to implement such an instantaneous reserve, and the rotation of the rotor supplies the energy necessary for this. The wind power installation, or the other generator, is thus controlled accordingly.

This is, in particular, based on the recognition of the fact that the provision of such an instantaneous reserve can be controlled, and in particular that increasing an instantaneous reserve can be controlled by increasing a speed of rotation. The increase in the speed of rotation of a wind power installation can, depending on how great the increase is, only lead to a minimal increase in the wear, and to a minimally impaired working point. However, in particular when such an increased instantaneous reserve is provided briefly, these effects are negligible while at the same time having a large achievable effect.

It is also recognized here that in fact wind power installations can usually store more kinetic energy in relation to their rated power than large power stations can. This is particularly due to the high moment of inertia of the large rotors of the wind power installations. This is exploited here as a stabilization measure, and is a further stabilization measure that can be implemented in the master controller, which the master controller can thus access when necessary.

The provision of at least one available instantaneous reserve is preferably carried out using an auxiliary controller.

According to one aspect, a frequency-dependent power control is used, and is characterized by a transfer function. This transfer function describes a relationship between an acquired frequency and a power to be set depending on the acquired frequency. This relates, in particular, to a power fed in depending on the frequency. A frequency-dependent power control is, in particular, one in which the power fed in, depending on the deviation between the frequency and a reference frequency value, in particular from the rated frequency, leads to a change in the power fed in.

In particular, the power fed in is increased or reduced depending on a deviation of the frequency from a reference value, in particular by an amount that is proportional to the frequency deviation. A dead band region can also be provided for the frequency, so that an upper or lower boundary value of such a dead band is used as the reference frequency value. Fundamentally, here, a frequency-dependent power control that is basically known can be used or can be taken as a basis here.

It is, however, further proposed that the transfer function of this frequency-dependent power control is adjusted depending on the power flow stipulation, the energy provision stipulation and the stability stipulation. Amplification factors, along with the size of a dead band region, can in particular be adjusted here. An appropriate amplification factor can be set in the case of a proportionality between the frequency deviation and the power change that is to be set.

In terms of a graphical illustration of this proportional dependency, such an amplification factor describes the gradient of the corresponding graph.

An amplification factor is, in particular, thus adjusted.

A further variant is that an activation time constant is adjusted, by means of which a time within which an associated power value is to be achieved after reaching a frequency value is specified. When driving wind power installations in particular, it is to be borne in mind that these can change the power they feed very quickly—significantly faster than large power stations. Such a fast changeability can be both advantageous and disadvantageous. If a fast reaction is called for, this is a usable advantage. It is then possible to react quickly to a frequency change. A frequency change can be an indicator of a fast change in the power in the electrical supply grid, for example the sudden disconnection of a large consumer. It is possible to react quickly to this through a corresponding power reduction.

On the other hand, a fast change in the power and an associated fast control can entail the risk of overcompensation, and thereby the risk of instability. This aspect is taken into consideration in that the adjustment is made depending on the stability stipulation. A high activation time constant can thus be useful when a stability requirement is particularly high.

Both the energy provision stipulation and the power flow stipulation can also contain information about special local features, so that, for example, a power reduction may be more desirable in one grid segment than in another grid segment. Such a requirement can be taken into consideration in that different activation time constants are chosen in the two exemplary grid segments referred to. A short activation time constant can be provided where the power reduction is desirable. In the event of a frequency rise, that would then lead to a power reduction there first. This may then already bring about an effect in that the frequency falls again before the power adjustment has started in the other grid segment, due to the choice of a larger activation time constant.

Similar considerations can also be taken into consideration in the choice of the amplification factor, in that the amplification factor is chosen to be larger in one grid segment than in another. In point of fact, the amplification factor can also affect the control speed, namely when the frequency changes continuously. A higher stability requirement can thus lead to a lower amplification factor, and vice versa.

According to one aspect it is proposed that a control dynamic is set. Similar considerations to those explained above in relation to the adjustment of the activation time constant can also be applied here. A control dynamic can also contain amplification factors and/or time constants such as integration time constants or ramp-up time constants. In the case of a linear control system, the control dynamic, or part thereof, can be adjusted by specifying characteristic values of the control system. The stability of the control system, including the tendency to fluctuate, can also be specified through the selection of the characteristic values. It is in particular appropriate to take the stability stipulation into consideration for the latter case.

The control dynamic can also contain local variations. Thus, in a grid segment in which the lowest possible change in power should occur, a correspondingly slow controller, i.e., a slow control dynamic, can be set, whereas in a different grid segment, where larger power fluctuations are allowed, a correspondingly faster controller is used, and thereby a more powerful control dynamic can be set.

It is in particular proposed that an order of magnitude of a frequency change that is to be expected is estimated, or that a maximum frequency change is taken as a basis, above which, namely, the electrical supply grid, or a partial segment thereof, must be switched off, or above which other extraordinary auxiliary interventions must be made. Due to the control dynamic, a maximum power change can be anticipated for this maximum frequency change, i.e., the maximum size of the frequency change. A power flow in the respective transmission paths can accordingly be anticipated, and compared with a power flow stipulation in this transmission path. The control dynamic is then to be selected such that the power flow stipulation can be maintained here.

The consideration of the energy provision stipulation can lead to similar limits. The energy provision stipulation can, however, also specify minimum energy values that must be delivered in any event. The control dynamic can then be selected such that this energy provision can still be ensured at the maximum frequency change to be assumed.

The stability stipulation is, however, also considered, and this can include the possibility that a special stability problem can be present, and that taking the stability into consideration has a correspondingly high priority. The result of this can be that satisfying the stability stipulation has the highest priority and that, for example, maintaining the energy quantity that has been referred to and that is to be delivered in accordance with the energy provision stipulation can be infringed if this is necessary in order to maintain the stability stipulation. The same can be true for the power flow stipulation which may in appropriate cases have to be observed, even if the energy provision stipulation cannot be maintained.

However, it is also to be borne in mind that the feed management system may also be proposed so that in such cases it is most likely that alternatives that can realize as many of the three said stipulations may be found. Thus for example, if the adjustment of a control dynamic, or the adjustment of the transfer function in some other manner, leads to exceeding a power flow stipulation in one transmission path, it is possible that the same frequency-dependent power control can, nevertheless be realized if the control of multiple generators is appropriately adjusted, so that these together still have the same desired frequency-dependent power control behavior, but are adjusted locally in such a way that, for example, said transmission path in which the power flow stipulation would otherwise be infringed, is more lightly loaded. In other words, the frequency-dependent power control is adjusted such that the power is at least in part transmitted over other transmission paths.

It is proposed according to one aspect that a power adjustment gradient is set that specifies a value for the magnitude of a frequency-dependent power change. Such a power adjustment gradient can, in particular, lie in the range between 0.1% up to 100%, and in particular in the range from 1% up to 100% of the rated power as a rate of change of power per second. It is recognized that the range can be very large. If a first power control is required, a reduction by the total rated power should occur within one second if possible. It is also, however, recognized that, in association with large power stations, a gradient of 10% per minute can be provided, so that the large power stations can follow this gradient.

This is based in particular on the recognition that large frequency changes can occur as a consequence, in particular, of a disconnection of a feed unit such as a large power station. Fast provision of primary control energy must then be ensured. The fastest possible increase in power is in principle desirable here, although this can be limited for reasons of stability. A maximum value for the power adjustment gradients can be provided for this purpose, leading to such a limitation.

It is, however, also to be considered that in such a case a power activation, or a power activation profile, is stipulated, this being a stipulation to be observed which, in particular, can be stipulated as an activation schedule. The power adjustment gradient can thereby be stipulated as a fixed value or as a minimum value, since, in particular, the slow feed installations such as large power stations will not exceed such a minimum value, so that for them it essentially acts as a fixed value.

In both of these cases, the triggering of the provision of such a primary control energy is triggered by a corresponding frequency behavior, so that this is again a frequency-dependent power control.

This power adjustment gradient is preferably matched to a dead time, since the two magnitudes together can specify the activation time constant within which an associated power value is to be achieved after reaching a frequency value.

It is proposed according to one aspect that the activation of a voltage-impressing mode of operation of at least one regenerative generator of the generators is done in such a way that at least one regenerative generator comprises a plurality of feed units that, in particular, are each designed as a converter, and that at least one of the feed units changes from a current-impressing mode of operation into a voltage-impressing mode of operation to activate a voltage-impressing mode of operation.

This is in particular based on the idea that in a current-impressing mode of operation, regenerative generators, in particular wind power installations, feed into the electrical supply grid by means of a large number of converters, which can also be designed as inverters, connected in parallel. A current-impressing mode of operation was already explained above, and essentially specifies a current that is to be fed in, and attempts to impress this into the grid. Such a mode of operation is associated with comparatively little need for actuating energy to implement the control when converters or inverters are used. Comparatively constant power can be fed in through this method.

Depending on the load situation, and thereby on the power flow stipulation, energy provision stipulation and stability stipulation, an at least supportive impression of voltage by wind power installations or other regenerative feed installations can come into consideration.

It is not entirely essential that all regenerative feed installations then supply feed in a voltage-impressing manner; partial support can often be sufficient. In order thereby to distribute the load of the voltage impression better over the regenerative generators, it is thus proposed that only a portion of the converters of each regenerative generator that is utilized for the voltage-impressing feed, i.e., the voltage-impressing mode of operation, is activated. A degree of activation, i.e., how many of the converters of the respective regenerative generator are activated for the voltage-impressing mode of operation, can in particular also be set here. This too can be specified differently for different regenerative generators, particularly depending on their location within the electrical supply grid. The feed management system can coordinate or carry out all of this. A central control unit can, for example, coordinate or control this activation of a voltage-impressing mode of operation of several converters.

According to one aspect it is proposed that the activation or the control of at least one load that operates depending on the grid frequency and controls power consumption depending on the grid frequency, is done in such a way that a load situation is acquired, and the activation or the control of the at least one load takes place depending on the acquired load situation. A load situation in this respect is a situation that reflects the amount of consumed power with which consumers are coupled to the electrical supply grid, and what type of consumers they are.

It is in particular recognized here that different load situations can be present, and that these load situations can be affected by the load controller. In the ideal case, a desired load situation can be set.

The type of consumer particularly distinguishes between a resistive load and a motor load. A resistive load is characterized by a power consumption that is essentially independent of the grid frequency. Thus, if the grid frequency changes, the power consumption of the resistive load does not change significantly if at all. A motor load is characterized by a power consumption that essentially depends strongly on the grid frequency. Thus, if the grid frequency changes, the power consumption of the motor load also changes. The motor load can, in particular, be characterized in that its power consumption is at least proportional to the grid frequency. It is recognized that this is the case, for example, with lifting gear or assembly lines. Their power consumption is in particular at least proportional to the grid frequency when at a rated operating point, preferably proportional to the grid frequency to the second or third power, i.e., proportional to the second or third power of the grid frequency.

A motor load is thus, in particular, a motor, or an electric machine, coupled directly to the electrical supply grid.

The load situation acquired in this way thus enables conclusions to be drawn about the behavior of the electrical supply grid. If, as used here as a simple example, a load situation is present exclusively having motor loads, then this electrical supply grid behaves entirely differently from one in which resistive loads are exclusively present. The loads, and thereby the electrical supply grid as a whole, accordingly also react differently in particular to a frequency change. This is taken into consideration when activating or controlling the at least one load.

In particular, to remain with the simplified example, an entirely motor load has the effect that this itself reacts to a rising frequency with an increased power consumption, and thus counteracts the cause for this frequency rise. The frequency-dependent power control can accordingly also take this behavior into consideration, and accordingly it then itself only namely needs to react to a lesser degree to the frequency changes. Otherwise, it can react more strongly to frequency changes. The activation or control of the at least one load can accordingly take the load situation into consideration, and thereby take the associated grid behavior into consideration.

It is in addition, or alternatively, proposed that a selection is made from a plurality of available loads to activate or control the at least one load that works depending on the grid frequency. At least two loads are thus present in this case. At least one of these loads is a resistive load, and at least a further one of the loads is a motor load. The differences have already been described above. It is then proposed here that a load that works in an appropriately frequency-dependent manner is, basically speaking, composed through the selection of the number and type of loads. A frequency-dependent power consumption dominates if a large number of motor loads are chosen. In the presence of a large number of resistive loads, this property is correspondingly weakened.

This choice can in particular be made depending on an acquired load situation. The largest possible number of motor loads is to be provided in particular when the acquisition of the load situation has shown that a strongly resistive load situation is present, and vice versa.

When, in particular, a frequency converter, which can also be referred to as a frequency inverter, is used, the operating mode of the load can also be changed, as it were from the point of view of the grid.

When a load is driven by means of a frequency converter, or if it contains one, the frequency converter is coupled on the one side to the electrical supply grid, and on the other side it controls a consumer, i.e., an appliance such as, for example, a speed-controlled motor or a charging station for charging electrical stores, such as for example electric vehicles. This frequency converter can not only drive the consumer, but it can also control the way in which the electrical power is drawn from the electrical supply grid. It can, so to speak, control a negative feed. It can also thereby control whether or not frequency changes lead to power changes. Through the use of such a frequency converter, the same load can thereby have a motor behavior, i.e., be operated as a motor load, or have a resistive behavior, i.e., be operated as a resistive load. This can also allow the load situation in the electrical supply grid to be taken into consideration.

It is proposed according to one aspect that the method operates in such a way that a load situation is acquired, wherein a load situation describes how much power is consumed by what type of consumer, in particular how much power in each case or what proportion of the power is consumed by resistive consumers and motor consumers and optionally consumers controlled by frequency converters, and wherein the master controller is selected or set depending on the acquired load situation.

It is in particular recognized here that not only is the control of a load depending on a load situation valuable, but that also the master controller, i.e., the network topology controller and the auxiliary controller, can be adjusted to the load situation. It is recognized that the load situation also affects the grid behavior, and does so in terms of the type of reaction, i.e., not only in terms of the quantity of power consumed.

A grid control apparatus is also proposed, namely a grid control apparatus for controlling an electrical supply grid for feeding electrical power into the electrical supply grid that has a grid voltage and a grid frequency, and the electrical supply grid comprises:
- a plurality of consumers to consume electrical power from the electrical supply grid, and
- a plurality of generators for generating electrical power and for feeding the electrical power into the electrical supply grid, wherein
- a feed management system is provided for managing the feed and
- the feed management system takes into consideration
- a power flow stipulation that establishes a stipulation for a power flow in at least one grid segment of the electrical supply grid,
- an energy provision stipulation that establishes a stipulation for the provision of a quantity of energy at at least one consumption point of the electrical supply grid, and
- a stability stipulation that specifies at least one stability criterion for the electrical supply grid, wherein
- the feed management system, depending on
- the power flow stipulation,
- the energy provision stipulation, and
- the stability stipulation
- selects or adjusts a master controller to support the feed.

Such a grid control apparatus comprises in particular a central control unit that centrally controls generators and/or loads and/or switchgear and in appropriate cases further elements of the electrical supply grid such as a tapped transformer. The feed management system can be implemented on this central control unit. In particular, the grid control apparatus, and thereby in particular the central control unit, is configured to carry out a method according to one of the aspects described above.

In addition, a grid segment of an electrical supply grid is proposed, namely a
- grid segment of an electrical supply grid with
  - at least one wind power installation and/or at least one wind farm with a plurality of wind power installations,
  - and the electrical supply grid comprises
    - a plurality of consumers to consume electrical power from the electrical supply grid, and
    - a plurality of generators for generating electrical power and for feeding the electrical power into the electrical supply grid, wherein
    - these generators comprise the at least one wind power installation or the at least one wind farm,
    - a feed management system is provided for managing the feed and
    - the feed management system takes into consideration
    - a power flow stipulation that establishes a stipulation for a power flow in at least one grid segment of the electrical supply grid,
    - an energy provision stipulation that establishes a stipulation for the provision of a quantity of energy at at least one consumption point of the electrical supply grid, and
    - a stability stipulation that specifies at least one stability criterion for the electrical supply grid, wherein
    - the feed management system, depending on
    - the power flow stipulation,
    - the energy provision stipulation, and
    - the stability stipulation
    - selects or adjusts a master controller to support the feed, and
    - the master controller for controlling the electrical supply grid operates the at least one wind power installation or the at least one wind farm.

Such a grid segment thus comprises at least one wind power installation or a wind farm with a plurality of wind power installations. This grid segment can be used to control the electrical supply grid, and is controlled for this purpose by the master controller. In particular, however, it is not only this at least one wind power installation or this at least one wind farm that is controlled by the master controller, but also the other generators and/or loads and, if relevant, switchgear and other elements in the electrical supply grid. It is recognized here in particular that this at least one wind power installation or this at least one wind farm can be very effectively operated and used for control of the electrical supply grid.

The grid segment has, in particular, a central control unit that can, for example, be physically located in the at least one wind power installation or the at least one wind farm, and can provide a central controller in order therewith to control, or at least participate in the control of the electrical supply grid by means of this grid segment.

It is, in particular, provided that the grid segment, in particular the central control unit therein, is configured to implement one of the methods described above. Such a method can thus be implemented in the central control unit. The features, in particular, that relate to the operation of regenerative generators are preferably entirely or partially executed on this at least one wind power installation or this at least one wind farm.

BRIEF DESCRIPTION OF THE SEVERAL VIEWS OF THE DRAWINGS

The invention will now be explained by way of example in more detail below with reference to forms of embodiment and with reference to the accompanying figures.

DETAILED DESCRIPTION

Figure 1:
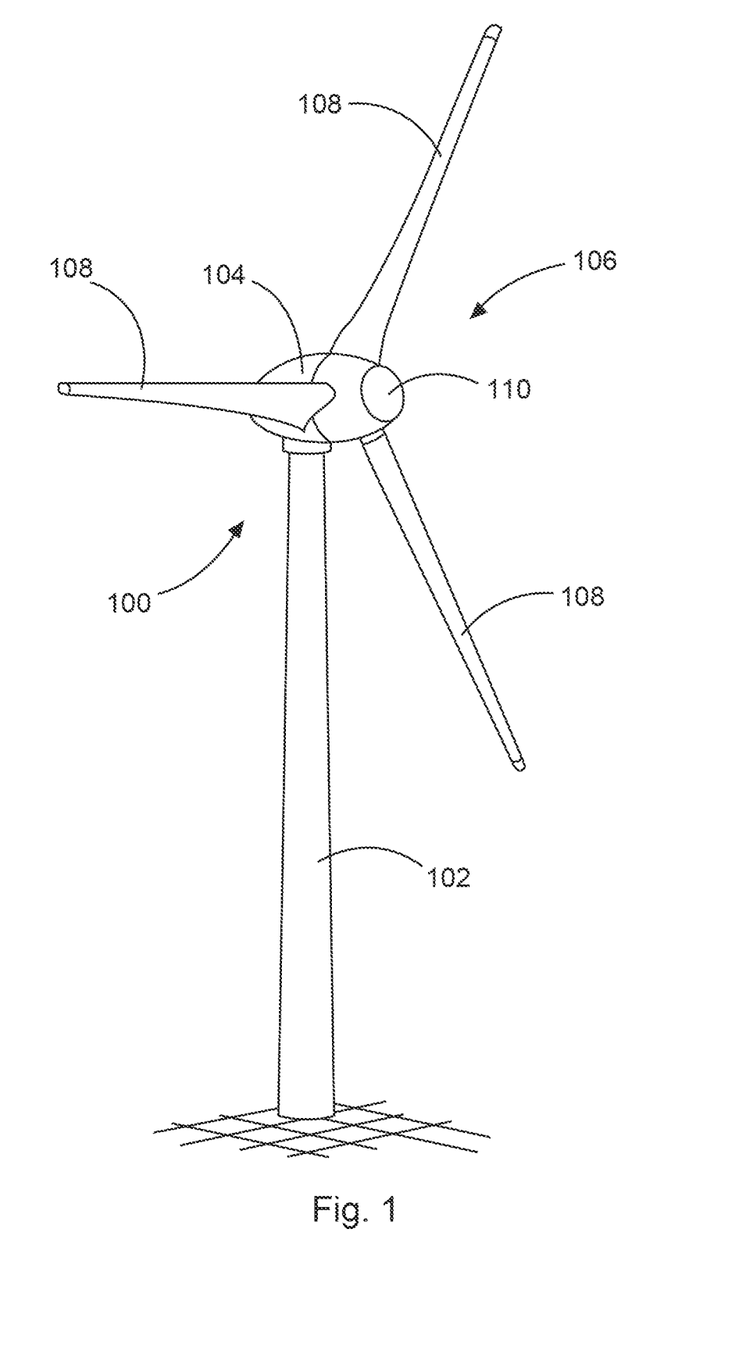
FIG. 1 shows a perspective view of a wind power installation.

FIG. 1 shows a wind power installation 100 with a tower 102 and a nacelle 104. A rotor 106 with three rotor blades 108 and a spinner 110 is arranged at the nacelle 104. The rotor 106 when operating is set into rotary movement by the wind, thereby driving a generator in the nacelle 104.

Figure 2:
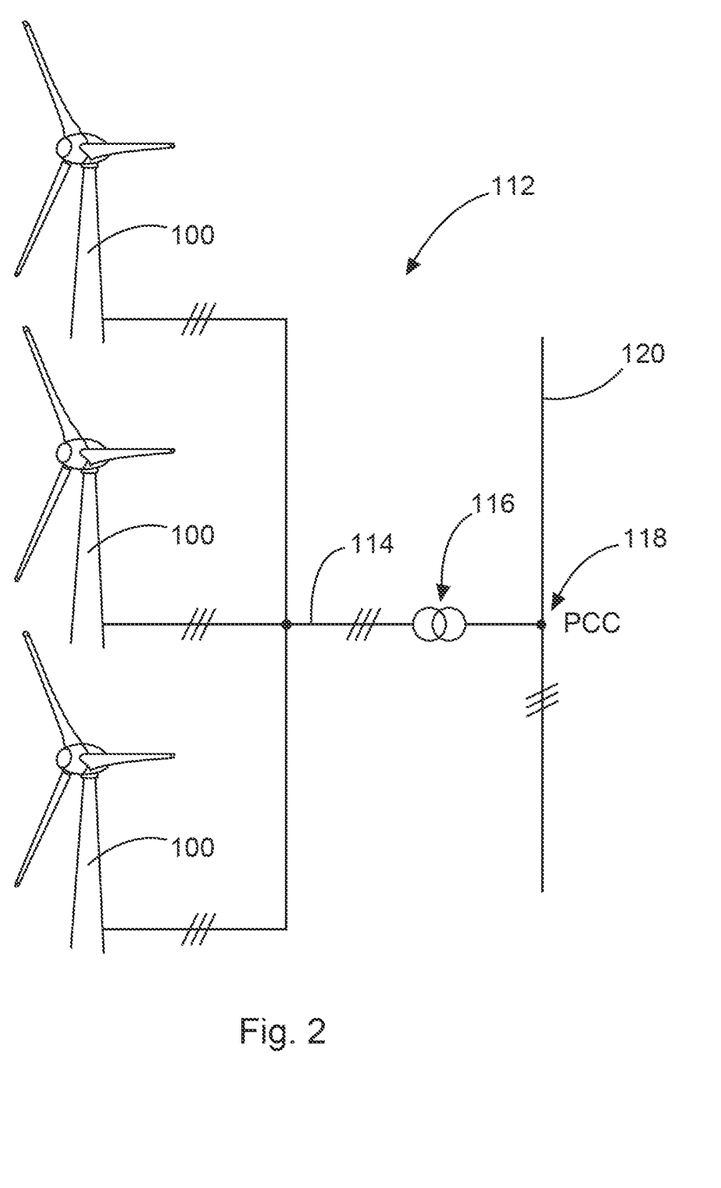
FIG. 2 shows a schematic representation of a wind farm.

FIG. 2 shows a wind farm 112 with, by way of example, three wind power installations 100, which can be the same or different. The three wind power installations 100 are thus representative of what in principle is an arbitrary number of wind power installations of a wind farm 112. The wind power installations 100 make their power, namely in particular the current generated, available via an electrical farm grid 114. The currents or powers generated by each of the individual wind power installations 100 are added together, and a transformer 116 that steps up the voltage in the farm is usually provided in order to feed it into the electrical supply grid 120 at the feed point 118, which is also generally referred to as the PCC. FIG. 2 is merely a simplified illustration of a wind farm 112 which, for example, does not show a controller, although of course a controller is present. The farm grid 114 can, of course, also be configured differently in that, for example, a transformer is also present at the output of each wind power installation 100, to mention just one other exemplary embodiment.

A method for stabilizing an electrical supply grid as well as a corresponding grid control apparatus are provided. In such an electrical supply grid it is particularly preferable for one or a plurality of wind power installations as shown in FIG. 1, and/or one or a plurality of wind farms as shown in FIG. 2, to be present and to feed into the electrical supply grid. Such wind power installations or wind farms can also provide a contribution to stabilization. In particular, a wind power installation or a wind farm can be part of the grid control apparatus, or at least be connected to such an apparatus. The wind power installation or the wind farm can thereby immediately execute or support a stabilization measure. The wind power installation or the wind farm can also provide information to ascertain a stability system property. Preferably it is proposed, in particular for any of the variations, that the grid control device is implemented in a wind power installation and/or in a wind farm, or that the wind power installation or the wind farm forms the grid control device.

Figure 3:
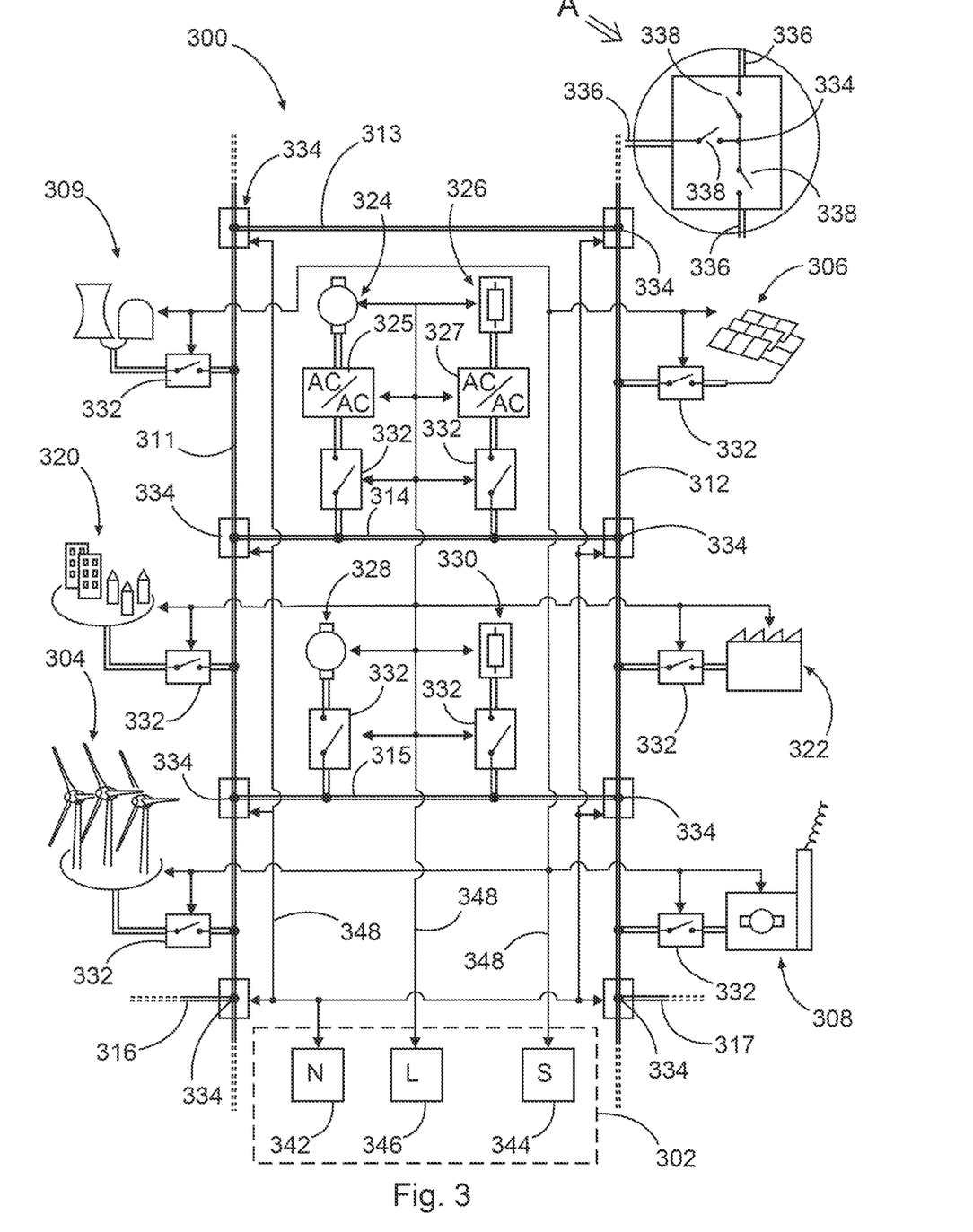
FIG. 3 shows schematically a grid segment of an electrical supply grid.

FIG. 3 shows schematically a schematic illustration of a grid segment 300 with a master controller 302. In this schematic illustration, energy lines are indicated by double lines, whereas single lines are representative of data lines. They symbolize data transmission paths which, however, do not necessarily have to be wired.

For the purposes of illustration, the grid segment 300 comprises inter alia two main cables 311 and 312 and three cross-cables 313-315. The precise structure is not, however, significant, and the division into these two exemplary main cables and three cross-cables has essentially only been chosen for the purposes of illustration, in order to give this schematically illustrated grid segment a certain structure that is nevertheless primarily helpful for the explanation. The two main cables could equally well have a higher voltage and, for example, be part of a high-voltage grid, whereas the cross-cables could, for example, have a medium voltage.

Accordingly, it should be clarified at this point that no transformers have been drawn in the schematic illustration of FIG. 3, although a very large number can, however, be present. In particular, the different voltage levels referred to by way of example between the main cables and the cross-cables, if present, would naturally make transformers necessary. In addition, two branch cables 316 and 317 are suggested and shown with dotted lines, and are only intended to illustrate that the corresponding cables could continue here. For the same reason, dotted lines have been drawn there as well as at the main cables 311 and 312, in order to suggest possible continuation.

The grid segment 300 comprises, by way of example, various generators and consumers. A wind farm 304, a photovoltaic installation 306 and two conventional power stations 308 and 309 are illustrated by way of example as generators.

A city 320 and a factory 322 are sketched as consumers. A motor consumer 324 and a resistive consumer 326, each with a frequency converter drive, are also drawn by way of example, as well as a motor consumer 328 and a resistive consumer 330, neither of which has a frequency converter drive.

All of these consumers and generators are, finally, representative of further consumers and/or generators, in particular in each case of consumers or generators of the same type.

All of the consumers and generators are each connected to the respective cable via a grid isolating switch 332, i.e., with a main cable or a cross-cable, or are connected to them there. These grid isolating switches 332 can differ from one another, particularly in their power classification as well as in the voltage level to be isolated. However, the same reference sign 332 is used here for the sake of simplicity for all the isolating switches.

A grid node 334 is provided in each case at connecting nodes between different cables, in particular between a main cable and a cross-cable, or a main cable and a branch cable. Each of these grid nodes 334 is shown with a frame in the drawing, in each of which isolating switches are provided in order, namely, to be able to disconnect each cable of this grid node or to reconnect them.

This structure of the grid nodes 334 is illustrated in more detail in the enlarged illustration A. It can be seen there that an isolating switch 338 is provided between each cable 336 and the grid node. For the sake of greater clarity, the same reference sign has been used both for the cables and for the isolating switches, although different designs may be considered. Transformers also may, moreover, be provided here, but for the sake of simplicity are not illustrated. The isolating switches 338, as well as the grid isolating switches 332 are shown, for the sake of clarity, in an open state, although naturally in operation of the grid segment not all of the grid isolating switches and isolating switches are open. The illustration is thus not intended to show an open state, but represents the respective switch in any switch position.

The master controller 302 for control of the grid segment is now illustrated. It comprises a grid topology controller 342, an auxiliary controller 344, and a load controller 346. The representation of these three controllers as blocks again serves for illustrative purposes. The master controller 302 can choose between these three controller types, although they can also be combined. They differ in their functionality and, in the illustration of FIG. 3, also particularly in which elements they operate. They can however also be integrated as a controller which depending on the control to be executed, accordingly operates the elements or does not operate them.

Various data lines 348 are also illustrated in this respect, connecting the different controllers to different elements. These are also to be understood as illustrative. If the three controllers are integrated into one total controller, and their different tasks or modes of operation are to that extent only called up functionally according to the situation, it is then also possible for a single data line, for example in the form of a data bus, to be taken from such a total controller to all the elements to be controlled. For this reason, the different data lines 348 are also identified with the same reference sign.

In any event, FIG. 3 illustrates that the master controller has access to three controllers, namely the grid topology controller 342, the auxiliary controller 344 and the load controller 346, and can therefore operate different elements.

It is provided here that the grid topology controller 342 can operate all of the grid nodes 334, and can thereby operate all of the isolating switches 338 at each grid node 334, as is namely shown in the enlargement A. The grid topology controller 342 can thereby change the topology of the grid segment 300, and thus of the electrical supply grid of which this grid segment is part, through appropriately opening or closing isolating switches 338.

The arrows at all the data lines 348 point both to the respective controller and to the respective element to be controlled. Expression is thereby given to the fact that the controllers can not only exercise operation, i.e., have an effect on the respective element, but that they can also receive data from there, namely sensor data and, in particular, data regarding switch positions or other states of the respective element, i.e., in particular, of the respective generator, consumer or switching element.

The auxiliary controller 344 is connected here to the generators, namely the wind farm 304, the photovoltaic installation 306 and the two conventional power stations 308 and 309. Both an immediate operation of the respective generator and an operation of the respectively assigned grid isolating switch 332 is provided here. The illustration is in this way kept general, and it may also be considered that some operations are not provided or not used. Strict limits are set for such operations, in particular in the case of the conventional generator 309 indicated as a nuclear power station, or the conventional generator 308 indicated as a coal-fired power station. However, an acquisition of, in particular, state data of these generators too also comes into consideration.

It is, however, in particular provided that the wind farm and the photovoltaic installation, or correspondingly many wind farms or photovoltaic installations, of which these two single elements are representative, can be operated and, in particular, their power output changed directly or through a change to control parameters. A disconnection from the grid through the corresponding operation of the grid isolating switch 332 also comes into consideration here.

The load controller 346, which operates all of the loads, is finally illustrated. Here again, an operation of the respective load as such and also of its grid isolating switch comes fundamentally into consideration. This is again, here, an illustration, and it is clear that the representative city 320 shown should only be disconnected from the grid in an exceptional case. The operation of the city can be realized in such a way that specific consumers within the city are operated.

Both the motor consumer 324 with frequency converter operation and the resistive consumer 326 with frequency converter operation comprise a corresponding frequency converter 325 or 327, both for the purpose of illustration and to represent the operation of other consumers. On the grid side, i.e., toward the cross-cable 314, these two frequency converters 325 and 327 can, when consuming power, control for example the phase position i.e., whether and how much reactive power is drawn. At the same time, a frequency-dependent behavior can be implemented in such frequency converters 325 or 327, or it can be implemented that a frequency-dependent behavior is at the time not present. Both the motor consumer 324 as well as the resistive consumer 326 could each—as seen from the grid, so to speak—be operated as motor consumers or as resistive consumers, in that this functionality is emulated by the respective frequency converter 325 or 327. It is possible thereby to control, namely to control by the load controller 346, how these two consumers behave, and thereby the load situation of the grid segment 300 as a whole can be controlled.

Another variant is to be explained with the aid of the motor consumer 328 and of the resistive consumer 330. These two consumers do not comprise a frequency converter, and are thus connected directly via the respective grid isolating switch 332 to the grid segment, in this case namely the cross-cable 315. These two consumers are again representative for many such consumers. If the grid isolating switch 332 of the motor consumer 328 is now closed, and with it the grid isolating switch of many further motor consumers, and the grid isolating switch 332 of the resistive consumer 330 is opened, and with it many further grid isolating switches of further resistive consumers, then in total a load situation is created in which the consumers exhibit a strong motor behavior.

Conversely, of course, it can also be provided that many resistive consumers are switched in and many motor consumers are disconnected. A ratio can equally well be set in which a few resistive consumers and a few motor consumers are connected.

These functionalities of the grid topology controller 342, the auxiliary controller 344, and the load controller 346 are thus illustrated in FIG. 3. The functionalities described can, however, also be realized by a controller, and the signals that must be transmitted to the generators or consumers for this purpose can be provided by a corresponding data bus. Data buses that are connected to many participants are fundamentally known, and can be employed here. A connection that is totally or partially not wired also comes into consideration.

Figure 4:
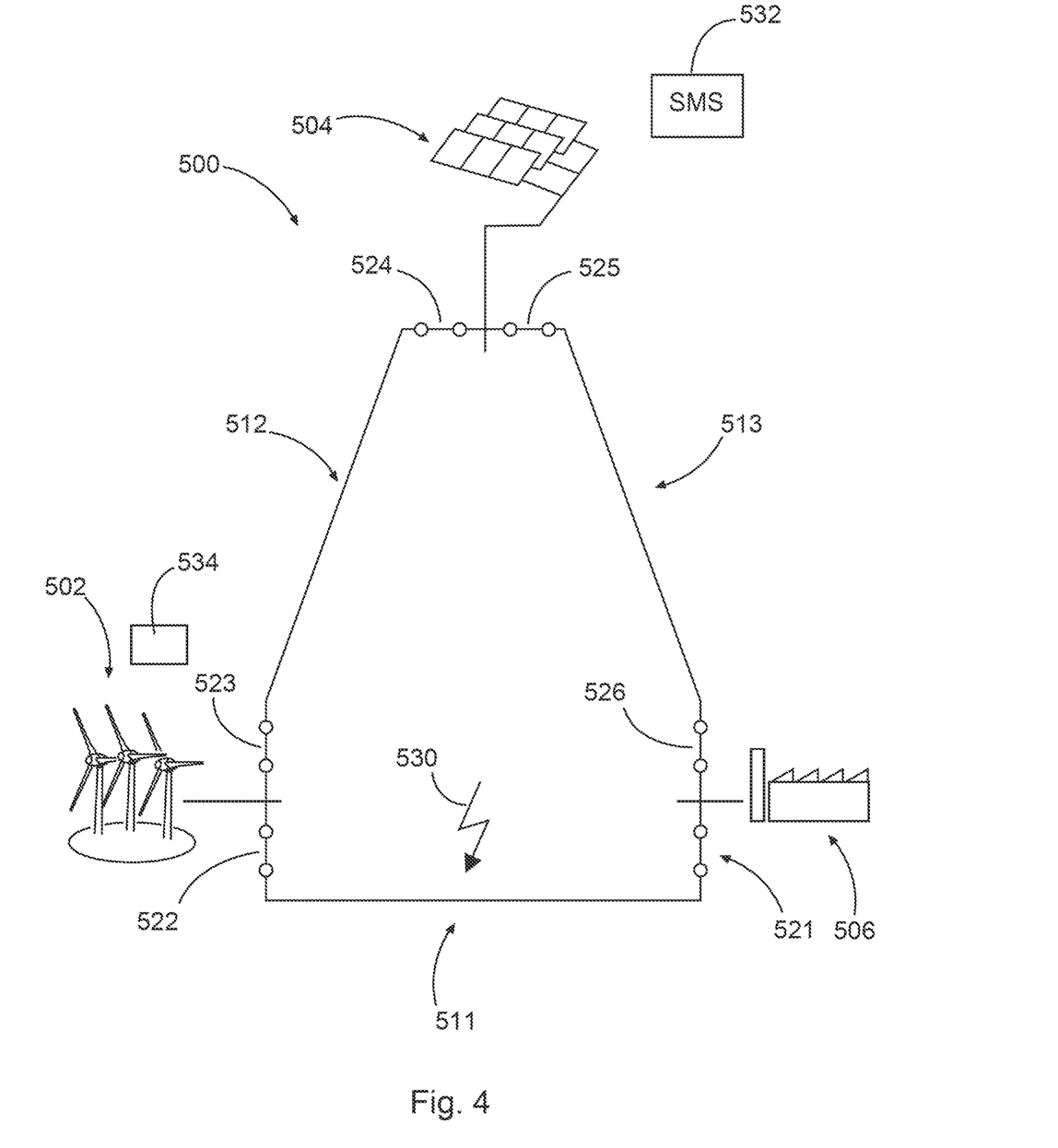
FIG. 4 shows a simplified network topology to illustrate a further embodiment.

FIG. 4 shows a simplified network topology 500 to illustrate a further embodiment. A wind farm 502, a photovoltaic installation 504 and a consumer 506 are contained therein. The wind farm 502, the photovoltaic installation 504 and the consumer 506 however also represent further corresponding elements, namely generators or consumers.

The wind farm 502, the photovoltaic installation 504 and the consumer 506 are connected to one another via a first, second and third transmission line 511, 512 and 513. Each of these transmission lines 511, 512 and 513 can be disconnected at two ends by one of six isolating switches, namely a first to a sixth isolating switch 521 to 526.

Such a disconnection can be triggered in that such a high current, namely in particular a short-circuit current, flows through the corresponding isolating switch that the respective isolating switch triggers. A correspondingly high short-circuit current can accordingly be caused when required for this purpose, namely fed in by a generator such as the wind farm 502 or the photovoltaic installation 504, or can be consumed by a consumer such as the consumer 506. Specific transmission lines can be disconnected in this way, and faults in such transmission lines thereby isolated.

A grid fault 530 is suggested by way of example at the first transmission line 511. The transmission line 511 can now be disconnected by triggering the first and second isolating switches 521 and 522, and the grid fault 530 thereby isolated.

It is now proposed that a grid stability property is first acquired for this purpose. A grid stability property would inter alia here be whether such a disconnection of the transmission line 511 of the simplified grid topology 500 is at all possible. Ensuring this can be seen as a stabilization measure. Being able to provide such a corresponding short-circuit current, or ensuring a sufficient magnitude of such a short-circuit current, can also be identified as a short-circuit current measure.

Possible short-circuit currents can be generated by different sources, and/or different short-circuit currents can be absorbed by different consumers in order to be able to trigger the disconnection. To explain the example of different sources, a short-circuit current, or part thereof, can be provided by the wind farm 502 for the second isolating switch 522. Part of the short circuit can also be provided by the photovoltaic installation 504 via the second transmission line 512. The photovoltaic installation 504 can also be specifically activated only for the provision of a short-circuit current if the short-circuit current would not be sufficient. Reactive current can be provided without solar radiation.

There are thus various possibilities for assembling the necessary short-circuit current, and each of these possibilities can be seen as a stabilization measure, from which a choice can be made.

The choice of how the short-circuit current is composed then depends on stabilization boundary conditions. At least one power flow stipulation, an energy provision stipulation and a stability stipulation may be considered as stabilization boundary conditions. The stability stipulation can supply a further stability criterion to the stabilization measure. One stabilization boundary condition here is that the wind farm 502 is not overloaded, which in this respect is a generator characteristic, and can continue to feed in a stable manner thereafter. A further stabilization boundary condition is to transmit as little power as possible, or at least not too much, via the second transmission line 512; this can be a higher-order grid property, in any event when the wind farm 502, the photovoltaic installation 504 and the consumer 506 are each representative of a grid segment, each being connected through one of the three transmission lines 511, 512 and 513.

The stabilization controller 532, which can be connected to the wind farm 502, the photovoltaic installation 504 and the consumer 506, is provided to control all this. Consideration may also, however, be given to the fact that the stabilization controller 532 is part of the wind farm 502, in particular part of a suggested central farm controller 534 of the wind farm 502. The stabilization controller 532 can here form a grid topology controller and be part of a master controller, or operate as a master controller.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for feeding electrical power into an electrical supply grid that has a grid voltage and a grid frequency, wherein the electrical supply grid includes:
   a plurality of consumers configured to consume the electrical power from the electrical supply grid; and
   a plurality of generators configured to generate the electrical power and feed the electrical power into the electrical supply grid,
   wherein the method comprises:
      controlling, by a feed controller, the feeding of the electrical power based on:
         a power flow setting that sets a power flow in at least one grid segment of the electrical supply grid,
         an energy provision setting that sets a provision of a quantity of energy at at least one consumption point of the electrical supply grid, and
         a stability setting that specifies at least one stability criterion for the electrical supply grid; and
      selecting or adjusting, by the feed controller, a master controller to support the feeding of the electrical power depending on the power flow setting, the energy provision setting, and the stability setting.

2. The method as claimed in claim 1, comprising:
   selecting at least one controller as the master controller or as part of the master controller from controllers including:
      a grid topology controller configured to change a grid topology of the electrical supply grid,
      an auxiliary controller configured to control the grid voltage, the grid frequency and/or a power balance of the electrical supply grid, and
      a load controller configured to control at least one of the plurality of consumers.

3. The method as claimed in claim 1, comprising:
   performing, by the master controller, at least one stabilization measure from a list including:
      adjusting a converter penetration of a grid segment of the electrical supply grid, wherein the converter penetration for the grid segment represents indicates a ratio of a sum of power fed in by converters to the electrical power fed in by all of the plurality of generators,
      provisioning a predefined minimum short-circuit current capacity to enable feeding in a short-circuit current at least up to the predefined minimum short-circuit current capacity at least at one grid node, wherein the short-circuit current triggers an isolating switch to disconnect a grid segment, activating at least one converter of a photovoltaic installation to provision a short-circuit current or a supplementary short-circuit current for activating the isolating switch to disconnect the grid segment, activating or adjusting a frequency-dependent power control, activating a mechanically rotating phase-shifter to provide an inertial mass, a short-circuit current and/or reactive power, activating a voltage-impressing mode of operation of at least one regenerative generator of the plurality of generators, activating a voltage-impressing mode of operation of a wind power installation or a photovoltaic installation of the plurality of generators, activating or controlling at least one load, wherein the at least one load depending on the grid frequency and controls power consumption of the at least one load depending on the grid frequency, and provisioning at least one instantaneous reserve or increasing the at least one instantaneous reserve.

4. The method as claimed in claim 3, wherein the at least one instantaneous reserve is a regenerative generator.

5. The method as claimed in claim 3, wherein increasing the at least one instantaneous reserve includes increasing an instantaneous reserve of at least one wind power installation by increasing a rotor rotation speed of the at least one wind power installation.

6. The method as claimed in claim 3, wherein:
the frequency-dependent power control is characterized by a transfer function that describes a relationship between an acquired frequency and a power to be set depending on the acquired frequency, and
the transfer function is set depending on the power flow setting, the energy provision setting, and the stability setting.

7. The method as claimed in claim 6, wherein setting the transfer function includes:
setting an amplification factor;
adjusting an activation time constant, wherein activation time constant represents a time period within which an associated power value is to be achieved after reaching a frequency value;
setting a control dynamic; and/or
setting a power adjustment gradient that specifies a value for a magnitude of a frequency-dependent power change.

8. The method as claimed in claim 3, wherein activating the voltage-impressing mode of operation of the at least one regenerative generator includes:
changing a mode of operation of the at least one regenerative generator from a current-impressing mode of operation into the voltage-impressing mode of operation, wherein the at least one regenerative generator includes converters.

9. The method as claimed in claim 3, wherein activating or controlling the at least one load includes:
determining a characteristic of the at least one load is acquired, and activating or controlling the at least one load depending on the characteristic of the at least one load; and/or
selecting, from a plurality of available loads, the at least one load that works depending on the grid frequency, wherein:

at least one first load of the plurality of available loads is a resistive load or is operated as a resistive load that is characterized by a power consumption that is independent of the grid frequency, and at least second load of the plurality of available loads is a motor load or is operated as a motor load that is characterized by a power consumption that depends on the grid frequency.

10. The method as claimed in claim 1, comprising:
determining a characteristic of a load, wherein the characteristic of the load represents amounts or proportions of power consumed by respective types of consumers, and wherein the types of consumers include resistive loads and motor loads.

11. The method as claimed in claim 10, wherein the types of consumers include consumers controlled by frequency converters.

12. The method as claimed in claim 10, comprising:
selecting or setting the master controller depending on the characteristic of the load.

13. A grid controller for controlling an electrical supply grid having a grid voltage and a grid frequency, wherein the electrical supply grid includes:
a plurality of consumers configured to consume electrical power from the electrical supply grid; and
a plurality of generators configured to generate the electrical power and feeding the electrical power into the electrical supply grid,
wherein the grid controller is configured to:
control the feeding of the electrical power based on:
a power flow setting that sets a power flow in at least one grid segment of the electrical supply grid,
an energy provision setting that sets a provision of a quantity of energy at at least one consumption point of the electrical supply grid, and
a stability setting that specifies at least one stability criterion for the electrical supply grid; and
select a master controller to support the feeding of the electrical power depending on the power flow setting, the energy provision setting, and the stability setting.

14. The grid controller as claimed in claim 13, wherein the grid controller is part of a central controller.

15. A grid segment of an electrical supply grid, wherein the electrical supply grid includes:
a plurality of consumers configured to consume electrical power from the electrical supply grid, and
a plurality of generators configured to generate the electrical power and feed the electrical power into the electrical supply grid, wherein the plurality of generators include at least one wind power installation or at least one wind farm having a plurality of wind power installations,
wherein a feed controller is configured to control the feeding of the electrical power based on:
a power flow setting that sets a power flow in at least one grid segment of the electrical supply grid,
an energy provision setting that sets a provision of a quantity of energy at at least one consumption point of the electrical supply grid, and
a stability setting that specifies at least one stability criterion for the electrical supply grid,
wherein the feed controller selects a master controller to support the feeding of the electrical power depending on the power flow setting, the energy provision setting, and the stability setting, and wherein the master controller is configured to operate the at least one wind power installation or the at least one wind farm.

\* \* \* \* \*